UNITED STATES PATENT OFFICE.

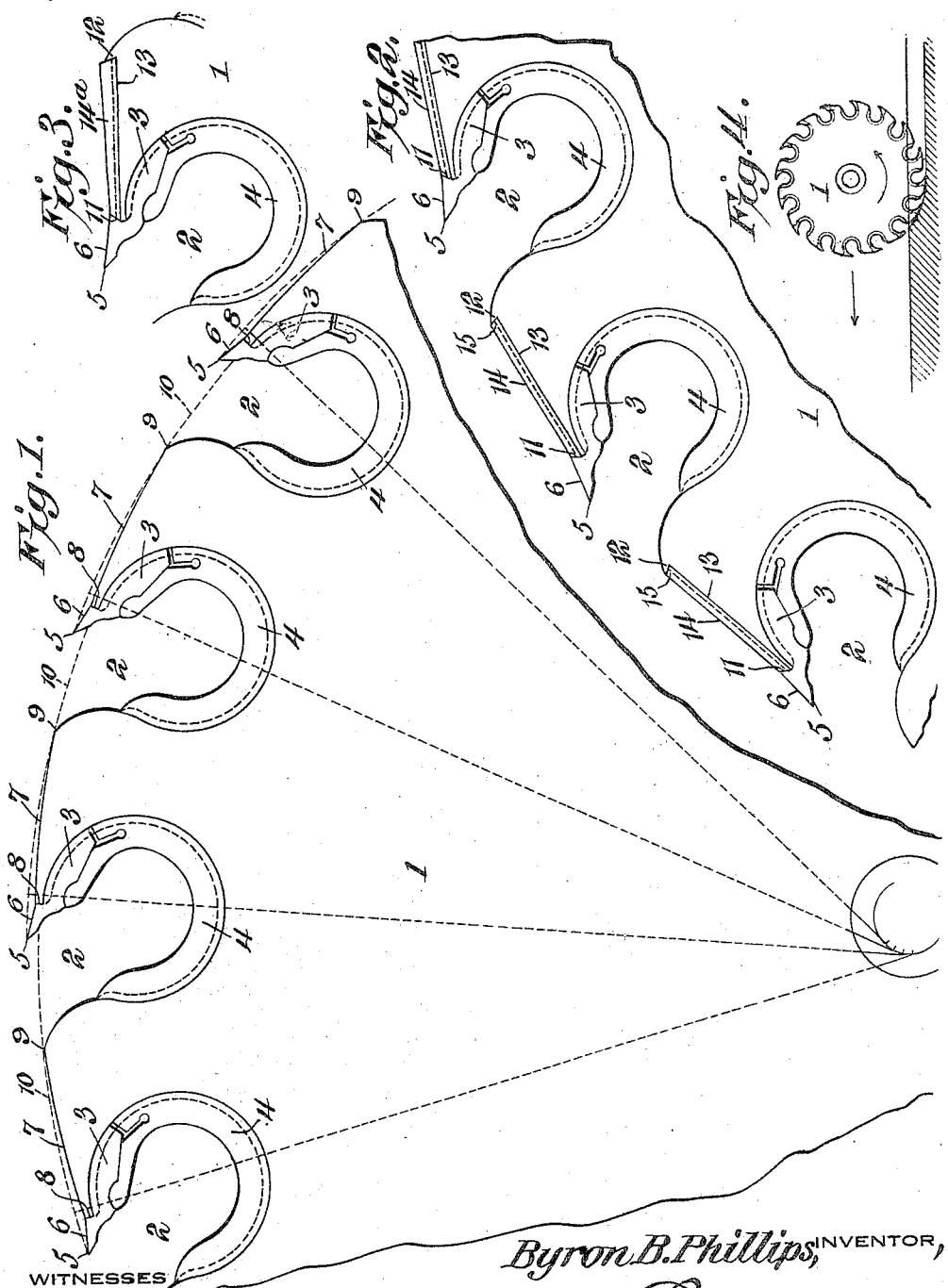

BYRON B. PHILLIPS, OF HUDSON, NEW YORK, ASSIGNOR TO GIFFORD-WOOD CO., OF HUDSON, NEW YORK.

ICE-SAW.

1,390,158.        Specification of Letters Patent.        Patented Sept. 6, 1921.

Application filed June 17, 1918. Serial No. 240,362.

*To all whom it may concern:*

Be it known that I, BYRON B. PHILLIPS, a citizen of the United States, residing at Hudson, in the county of Columbia and State of New York, have invented a new and useful Ice-Saw, of which the following is a specification.

This invention has reference to ice saws, and its object is to provide a circular saw for cutting ice, which, when cutting ice in the field, will constitute the means for propelling the saw and a power unit for rotating the saw across the ice field at the time of cutting a groove in the ice, the propulsion of the machine, of which the saw forms a part, being due solely to the saw itself. In the case of floating blocks of ice with the saw fixed against progressive movement across the ice the same effect is obtained, except that the ice moves under the saw instead of the saw moving over the ice.

It has heretofore been the practice in cutting ice with circular saws to provide a machine with a power unit for driving the saw and the same power unit has been utilized to drive some form of tractor means in addition to driving the saw. With such an ice sawing machine the surface of the ice is quite deeply scored, usually into rectangles, in order that the ice may thereafter be broken up into blocks.

In accordance with the invention the circular saw plate is formed with a peripherally located series of relatively large circular throats and the peripheral portion of the saw plate between the throats is concentric, or nearly so, with the saw. Each throat has a removable saw tooth lodged therein, which tooth is provided with a cutting end adapted particularly for ice. The large throat is essential to carry the ice chips out of the groove, owing to the expanding nature of pulverized ice. The saw differs in material respects from circular ice saws as heretofore constructed, in that the saw teeth, the extent to which the saw teeth bite into the ice, and the sides of the throats are all so related that the pulverized ice cut by the teeth fills the throats until there is established sufficient pressure on the side walls of the groove being formed to pull the machine along. In order to determine the tractive effect of the saw the periphery thereof has heels or abutments, each so disposed with reference to the cutting end of a tooth and the throat succeeding in order of rotation that the depth into the ice which the tooth will bite in the progressive movement of the saw may be properly established.

The heels may be formed directly on the saw plate or may constitute a removable device permitting a considerable variation in the cut of a tool by the exchange of such removable heel.

With such a saw, it is quite feasible to eliminate traction means for bodily propelling the saw and its mounting along the ice, since the saw of the invention, and with it the machine on which the saw is mounted, is automatically fed along the ice when the lower run or edge of the saw cuts the surface of the ice, the machine being guided by a previously formed groove. The machine will run by itself from side to side of the field being cut and when the machine started at one side of the field reaches the other side thereof, it may be stopped, turned around and started back again, this operation being continued as long as necessary. In the event of scoring cakes of large dimensions detached from the main field, the saw may be held against travel and the floating ice caused to travel under the saw by the pull of the latter on the cake of ice.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a plan view of a small segment of a circular saw showing the invention applied.

Fig. 2 is a similar view showing a removable heel construction.

Fig. 3 is a detailed view showing a form of heel which may be substituted for that shown in Fig. 2.

Fig. 4 is a diagrammatic view showing the action of the saw upon the surface portion of the ice to cause it to propel the ice sawing machine without other tractor means than the saw itself.

Referring to the drawing, there is shown a circular saw plate 1 which may, in the main, follow the usual construction of saw plates. About the periphery of the plate are throats 2 each shaped to receive a removable saw tooth 3 and locking device 4. Both the tooth and locking device may be of known construction and, therefore, need no special description. The point 5 of each tooth has a sloping outer face 6 merging into a marginal portion 7, the tooth abutting against the shoulder 8 where meeting the marginal portion 7. At a distance from the shoulder 8 the marginal portion 7 is, in the construction shown in Fig. 1, formed into a heel 9 at the entrance of the throat 2. It is this heel which determines the cut of the tooth into the ice as the saw advances, and the radial distance of the heel from the center of the saw, as well as the extent of the point of the tooth 5 beyond the periphery of the saw, causes the bite of the tooth into the ice to be shallow or deep as the case may be. If an arc, represented by the dotted line 10, be struck from a center eccentric to the center of rotation of the saw with the arc touching the point of a tooth and the heel 9 behind the tooth, it will ultimately, if continued far enough, strike the next succeeding tooth at a distance inside of the point of the tooth, which distance will be the depth of cut or bite of the tooth. For ice, the cutting end of the tooth is beveled into the throat 2, this causing fine chips of brittle ice to be cut away from the body of the ice and, as such fine chips of ice have a tendency to expand, they quickly fill the throat and exert pressure on the side walls of the groove being cut. By properly proportioning the parts, that is, the tooth, throat and heel, such pressure and friction are made enough to pull the machine along at a speed within the limits of the power of the machine.

In Fig. 4 the mode of operating the saw is indicated. The saw is assumed to be mounted upon a vehicle with the usual guides and a power unit individual to the vehicle and connected up to the saw for rotating the latter. Assuming that a groove has been formed across the field over which the saw is to travel, the usual saw guide is inserted in the groove, and the saw is arranged so that its underrun enters the surface of the ice for a suitable distance, which distance may range from a relatively small fractional part of the radius of the saw to a depth nearly equal thereto, this not affecting the tractive effect of the saw.

The arrangement is advantageous because there is no injury to the surface of hard ice such as would occur with the usual tractor devices and, if the surface be soft, as sometimes occurs, traction devices are then not as efficient as desirable. With the saw itself used as a tractor it is always engaging hard ice where the blocks are to be separated, and hence there is no marring whatever of the ice surface, while the tractive effect is efficient both on hard-surface ice and on soft-surface ice.

In order to obtain a greater speed of travel of the saw over the ice in the structure shown in Fig. 1, the heels 9 of the portions 7 are ground or filed off, wherefore, the previous speed of travel cannot be restored. In order to avoid this, the structure shown in Figs. 2 and 3 may be employed. That portion of the tooth which, in Fig. 1, abuts the shoulder 8 is, in Figs. 2 and 3, undercut or beveled as indicated at 11. The same arrangement of undercut or bevel is provided at the part of the surface 7 where, in Fig. 1, the heel 9 is located, that is, the heel portion 9 has an undercut or bevel shoulder 12 formed thereon facing the undercut 11. The portion 7 is inset to form a seat 13 between the undercut parts 11 and 12, and this seat receives a removable strip 14 having a heel portion 15 serving the same purpose as the heel 9. The strip 14 is beveled at the ends to lodge at one end against the shoulder 12 and at the other end in the undercut 11 of the tooth. By providing two or more sets of strips 14 the cut or bite of the saw tooth may be varied by having the shoulder 15 at varying distances from the axis of rotation of the saw. The nearer to the center of the saw the shoulder 15 is the higher the speed of progressive travel of the saw and the farther away from the center of the saw the shoulder 15 is located the slower will be the speed of travel.

A certain bite or cut of the teeth is needed to impart a sufficient grip of the saw on the ice to propel the ice sawing machine over the ice. This may be arranged by determining the distance of the heel 9 from the center of the saw, but this will become changed in the course of time by the wear of parts, then requiring a considerable amount of work to readjust the saw. In the structure shown in Fig. 2, it is simply necessary to exchange strips 14, which have been used, for other strips, such as the strips 14ᵃ in Fig. 3, where the heel portions may be thicker than those portions lodged under the bevels 11 of the teeth 5.

In order to obtain the tractive effect for driving the machine across a field of ice at a minimum expenditure of power it is necessary to construct the saw along the lines described with the parts properly proportioned for the purpose.

As an example, taken from actual practice, it may be assumed that the saw is provided with twenty teeth, with the points spaced five inches apart and cuts a groove three-eighths of an inch wide. The superficial area of each throat amounted to about five square inches and each tooth advanced one-quarter of an inch per revolution, the heel being properly proportioned for the purpose. Such saw cut and pulverized enough ice to fill each throat and to compress the pulverized ice to a proper degree to cause sufficient friction on the side walls of the groove to provide the required tractive effect without consuming more than a minimum amount of power for the work to be performed. The advance of the tooth, taken as one-quarter of an inch, is determined by the heel. If the saw has twenty teeth then it will advance five inches each revolution, and if the saw be rotating six hundred times per minute the machine will advance two hundred and fifty feet per minute.

Of course, similar or even quite different results may be obtained by varying the proportions, but the dimensions given are those of actual practice and have proven to be efficient, particularly from an economic standpoint.

The point of each saw tooth extends beyond the periphery of the saw and the tooth itself recedes from the point rearwardly toward the body of the saw blade, while the heel which is located in the neighborhood of the next succeeding throat extends forwardly and inwardly until it meets the preceding saw tooth. This provides clearance for the saw tooth and the heel or abutment controls the feed of the saw through the ice by engaging with the ice at the forward edge of the saw kerf.

What is claimed is:—

1. A circular saw for cutting ice, provided with a circular series of cutting teeth each having a throat and an abutment back of and spaced from the tooth and projecting outwardly from the body of the saw and adapted to bear against the ice at the forward edge of the saw kerf.

2. A circular saw for cutting ice, provided with a circular series of cutting teeth, each tooth having a throat of a size to cause it to pack with the ice cut by the tooth in its travel through the ice, the tooth having its rear wall receding into the body of the saw blade to provide a clearance, and an abutment or heel located between the base of that portion of the tooth providing the clearance and the next throat to the rear, and then receding into the body of the saw blade until it meets the clearance wall of the preceding tooth, whereby the engagement of the abutment with the ice at the forward edge of the saw kerf determines the feed of the saw through the ice.

3. A circular saw for cutting ice, provided with a circular series of saw teeth, a throat for each saw tooth, and a heel or abutment between the teeth and adjacent to the throat of the next succeeding tooth, the point of each saw tooth extending beyond the periphery of the saw blade and the tooth then receding from the point rearwardly toward the body of the saw blade and the heel extending forwardly and inwardly until meeting the saw tooth, whereby to provide clearance for the saw tooth, the heel or abutment controlling the feed of the saw through the ice.

4. A circular ice saw provided with a peripherally located series of throats and having the marginal portion of the saw between the throats inset, an insertible saw tooth located in each throat with the back of the tooth and the end of the inset portion remote from the tooth oppositely beveled, and a removable heel strip lodged in the inset portion and held thereto by the opposite bevels.

In testimony, that I claim the foregoing as my own, I have hereto affixed my signature.

BYRON B. PHILLIPS.

Witnesses:
E. M. KARR,
A. C. BENNETT.